United States Patent
Balogh et al.

(10) Patent No.: US 6,639,183 B2
(45) Date of Patent: Oct. 28, 2003

(54) METHOD FOR ATTACHING PARTS TOGETHER USING GAS METAL ARC WELDING

(75) Inventors: Frank E. Balogh, Dayton, OH (US); Steven Paul Donahue, Fairborn, OH (US); Venkatasubramanian Ananthanarayanan, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 43 days.

(21) Appl. No.: 10/010,670

(22) Filed: Dec. 6, 2001

(65) Prior Publication Data

US 2003/0106882 A1 Jun. 12, 2003

(51) Int. Cl.$^7$ ................................ B23K 9/67
(52) U.S. Cl. .................... 219/137 PS; 219/74
(58) Field of Search ............... 219/137 PS, 137 R, 219/146.1, 74

(56) References Cited

U.S. PATENT DOCUMENTS

2001/0008235 A1 * 7/2001 Miszczak et al. ........ 219/146.1

OTHER PUBLICATIONS

Taylor Lyman, editior, Metals Handbook, 8th edition, vol. 6, "Welding and Brazing", 1971, p. 80.*

* cited by examiner

Primary Examiner—Clifford C. Shaw
(74) Attorney, Agent, or Firm—Scott A. McBain

(57) ABSTRACT

A method for attaching parts together includes several steps. A metal-core consumable welding wire is obtained in one step. In another step, the parts (such as a ring and a base cup of a cylinder of a damper, such as a vehicle shock absorber) are positioned to create a joint line for welding the parts together. An additional step includes gas metal arc welding the positioned parts together using the metal core wire at a negative electrical welding potential relative to the parts creating a weldment along the joint line. In one example, during welding, the parts have a positive electrical welding potential, and the wire is electrically grounded.

10 Claims, 3 Drawing Sheets

METHOD FOR ATTACHING PARTS TOGETHER USING GAS METAL ARC WELDING

TECHNICAL FIELD

The present invention relates generally to methods for attaching parts together, and more particularly to a method for attaching first and second parts together using gas metal arc welding.

BACKGROUND OF THE INVENTION

Conventional methods for attaching parts together include welding such as gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. It is known in conventional gas metal arc welding techniques to adjust the relationship between the electrical welding current and the electrical welding potential to create a sharp tip on the metal wire at the end of a weld in preparation for the start of another weld.

The conventional gas metal arc welding techniques have been employed to weld a ring to a base cup of a cylinder of a damper such as a vehicle shock absorber. Such welding is done when the base cup has been resistance seam welded to the cylinder and the cylinder filled with damping oil and possibly pressurized gas. A typical ring is a low carbon steel ring having a length of 0.5 inch, an outside diameter of 2 inches, and a thickness of 4 millimeters. A typical base cup is a low carbon steel base cup having an outside diameter of 2 inches and a thickness of 2 millimeters. Simultaneous welds are created on each side of the 0.5-inch-long contact line of the ring on the base cup by using two weld torches. These are short length, large gap welds between a thicker metal and a thinner metal. Each weld using a conventional gas metal arc welding technique is likely to have a weave shape created by moving each weld torch in a saw-tooth path to better fill the large gap. A straight-line welding path along the contact line (or even a weave welding path) using a conventional gas metal arc welding technique would not create a weldment of sufficient leg length for the required weld strength without creating too much heat in the base cup and a potential undesirable burn through. Burn through would result in the expulsion of the pressurized gas and/or damping oil in the cylinder as well as turning the cylinder, base cup, and ring into scrap.

What is needed is a method for attaching two parts together, such as a ring and a base cup of a cylinder of a damper, using gas metal arc welding which is improved over conventional gas metal arc welding techniques.

SUMMARY OF THE INVENTION

A first method of the invention is for attaching first and second parts together and includes steps a) through c). Step a) includes obtaining a metal-core consumable welding wire. Step b) includes positioning the first and second parts to create a joint line for welding the first and second parts together. Step c) includes gas metal arc welding the positioned first and second parts together using the metal-core consumable welding wire at a negative electrical welding potential relative to the first and second parts creating a weldment along the joint line.

A second method of the invention is for attaching a ring to a base cup of a cylinder of a damper and includes steps a) through c). Step a) includes obtaining a metal-core consumable welding wire. Step b) includes positioning the ring in contact with the base cup to create a joint line for welding the ring and the base cup together. Step c) incudes gas metal arc welding the positioned ring and base cup together using the metal-core consumable welding wire at a negative electrical welding potential relative to the ring and base cup creating a weldment along the joint line.

Several benefits and advantages are derived from the invention. Use of the metal-core consumable welding wire (with its powdered metal core) allows melting with lower heat input per unit weight than using solid metal cores. Having the metal core wire at a negative electrical welding potential relative to the parts causes the lighter electrons to be attracted to and strike the parts while the thousand times heavier positive ions in the arc plasma are attracted to and strike the metal core wire which results in less heat imparted to the parts than having a reversed electrical potential. The novel combination of using the metal-core consumable welding wire and the negative electrical potential of the wire relative to the parts reduces or eliminates the danger of burn through when welding parts requiring a leg length (i.e., the weldment height of the fit-up gap between two locations, one on each part, where the weldment height is substantially perpendicular to the welding length) to part thickness ratio at the weldment of at least two and allows such weld to be done with one pass along the joint line between the parts without having to weave the weld about the joint line. These large leg-length requirements are dictated by the geometry of the joint having a large gap between the parts along the weld line. A straight line weld is expected to require only half the time compared with conventional weave welds of rings to base cups of cylinders of dampers such as vehicle shock absorbers. It is noted that conventional gas metal arc welding techniques are adequate for straight line welds only when the required leg length is equal to or less than the pre-weld thickness of the thinner part.

DESCRIPTION OF THE PREFERRED EMBODIMENTS

Figure 1:
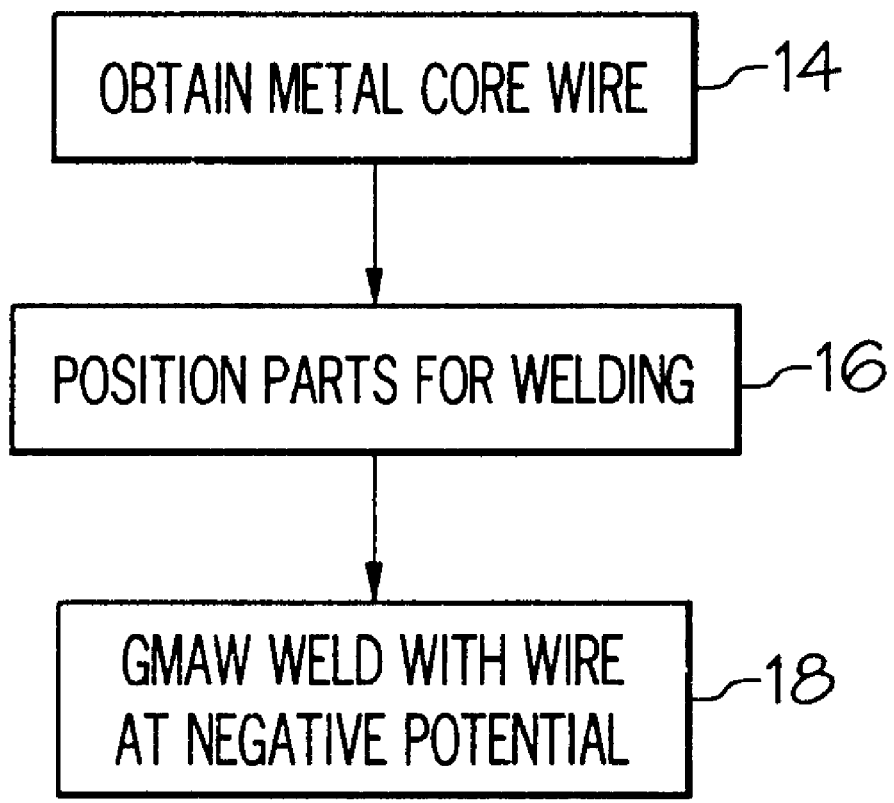
FIG. 1 is a block diagram of a first method of the invention.
Figure 2:
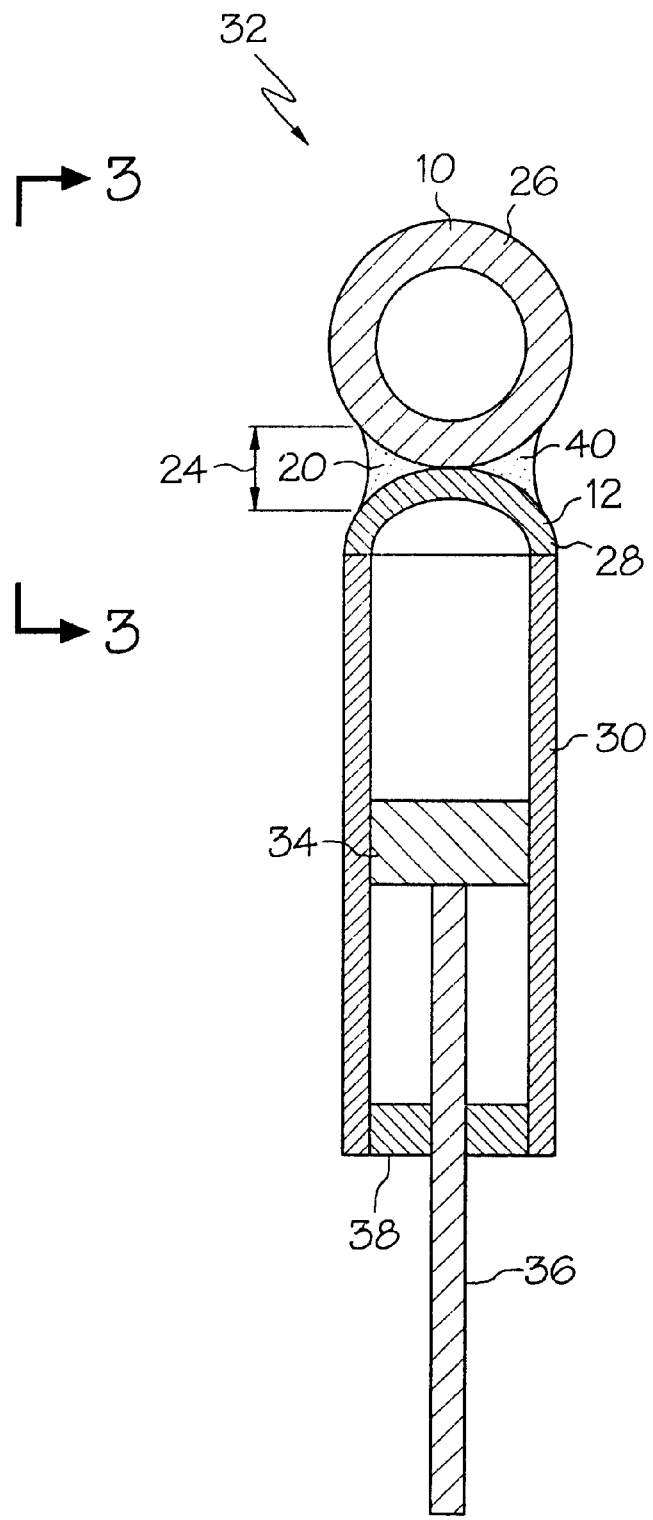
FIG. 2 is a cross-sectional view of a damper including a ring welded to a base cup showing a weldment created by the method of FIG. 1.
Figure 3:
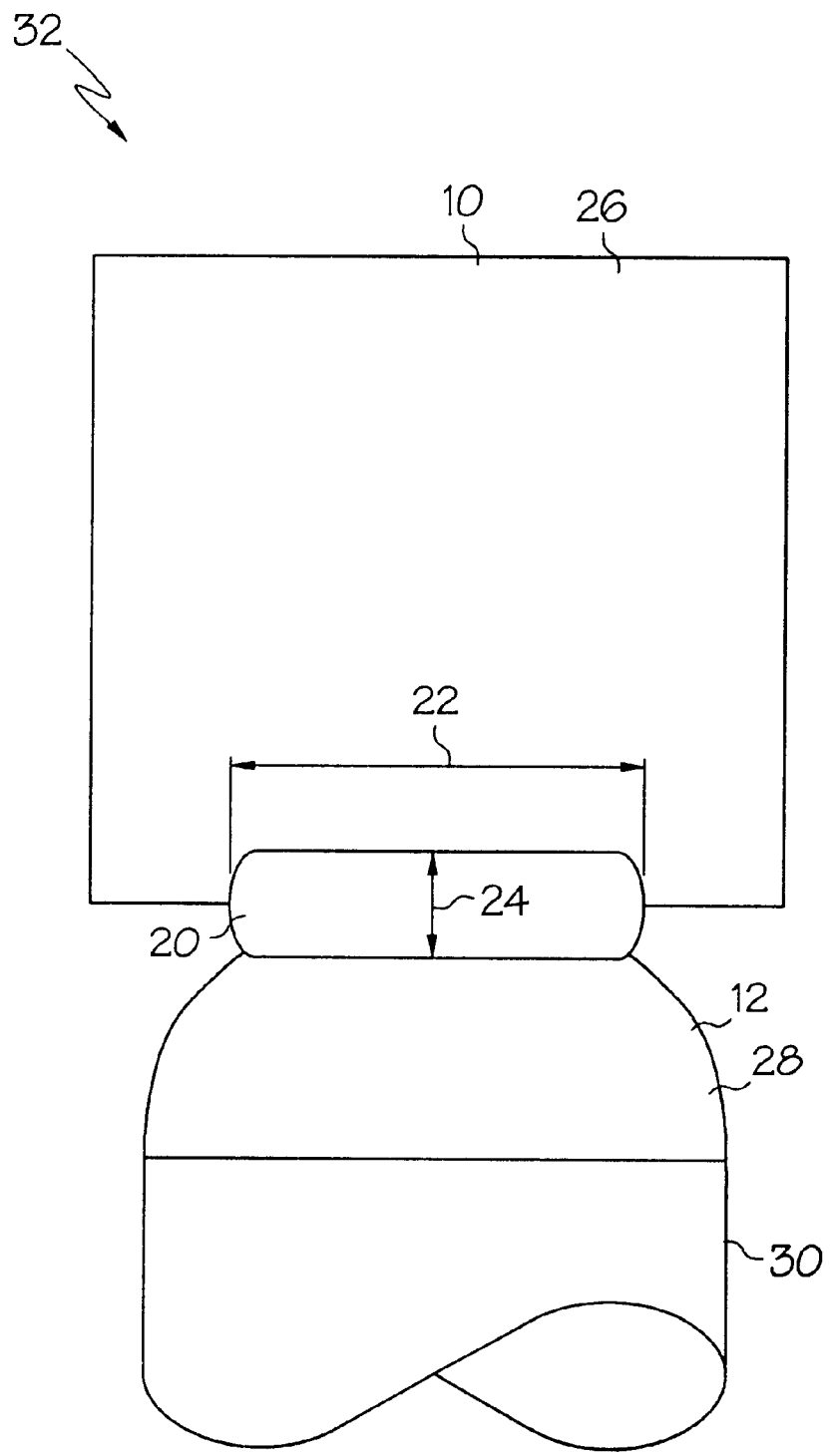
FIG. 3 is an external view of a portion of the damper of FIG. 2 taken along lines 3—3 of FIG. 2 showing the ring, the base cup, and the weldment.

Referring to FIGS. 1–3, wherein like numerals represent like elements throughout, a first method of the invention is for attaching first and second parts 10 and 12 (seen in FIGS. 2 and 3) together and includes steps a) through c). Step a) is labeled as "Obtain Metal Core Wire" in block 14 of FIG. 1. Step a) includes obtaining a metal-core consumable welding wire. A metal-core consumable welding wire is an annular-solid wire whose core is filled with metal powder (such as a mixture of metal, alloy and/or oxide powders). The metal-core consumable welding wire becomes filler metal during welding. Metal-core consumable welding wires are well known and standard in the welding art. Step b) is labeled as "Position Parts For Welding" in block 16 of FIG. 1. Step b) includes disposing the first and second parts 10 and 12 to create a joint line for welding the first and second parts 10 and 12 together. A joint line is a line of close proximity between parts to be welded and on at least a portion or portions of which a weldment is to be created to attach the parts together. A joint line can be straight or can be curved in two or three dimensions. Depending on part shape and dimensions, part attachment can include a plurality of joint lines and/or weldments. Step c) is labeled as "GMAW Weld With Wire At Negative Potential" in block 18 of FIG. 1. Step c) includes gas metal arc welding the disposed first and second parts 10 and 12 together using the metal-core consumable welding wire at a negative electrical welding potential relative to the first and second parts 10 and 12 creating a weldment 20 (seen in FIGS. 2 and 3) along the joint line. The metal-core consumable welding wire having a negative electrical welding potential relative to the first and second parts 10 and 12 is equivalent to the first and second parts 10 and 12 having a positive electrical welding potential relative to the metal-core consumable welding wire. Examples of such relative electrical welding potentials include: the parts at plus ten units with the wire at plus four units; the parts at plus six units with the wire grounded at zero units; the parts at plus five units with the wire at minus one unit; and the parts at minus two units with the wire at minus eight units.

In one example of the first method, the gas metal arc welding of step c) follows the joint line without weaving about the joint line. In one variation, the joint line is a substantially straight line. In one implementation, the metal-core consumable welding wire is electrically grounded during the gas metal arc welding of step c), and the first and second parts 10 and 12 have a positive electrical welding potential during the gas metal arc welding of step c).

In the same or different example of the first method, the weldment 20 has a welding length 22 (seen in FIG. 3) and a leg length 24 (seen in FIGS. 2 and 3) substantially transverse to the welding length 22, wherein the leg length 24 is at least equal to twice the pre-weld part thickness of the thinner one of the first and second parts 10 and 12 at the weldment 20. In one modification, the leg length 24 is at least equal to three times the pre-weld part thickness of the thinner one of the first and second parts 10 and 12 at the weldment 20. In one variation, the thinner one of the first and second parts 10 and 12 at the weldment 20 has a thickness of three millimeters or less. In another variation, the thinner one of the first and second parts 10 and 12 at the weldment 20 has a thickness of two millimeters or less.

In one execution of the first method, step c) includes adjusting the relationship between an electrical welding current and the electrical welding potential to create a sharp tip on the metal-core consumable welding wire when step c) finishes creating the weldment 20. A "sharp" welding-wire tip means, in the welding art, that the diameter at the tip is no larger than the diameter of the wire away from the tip. Creating a sharp tip on a metal-core consumable welding wire in gas metal arc welding by adjusting the relationship between the electrical welding current and the electrical welding potential is well known in the welding art and is done to facilitate a good arc-start for the next weld.

The first method is especially useful in attaching parts together wherein the thinner part has a thickness of 1.5 to 4 millimeters at the weldment and wherein the parts consist essentially of a low carbon steel such as AISI 1008 to 1010 steel and which may be zinc or tin coated.

A second method of the invention (which can be described from the same FIG. 1 block diagram as the first method) is for attaching a ring 26 to a base cup 28 of a cylinder 30 of a damper 32 (seen in FIGS. 2 and 3, wherein the damping oil and pressurized gas within the cylinder have been omitted for clarity) and includes steps a) through c). Step a) is labeled as "Obtain Metal Core Wire" in block 14 of FIG. 1. Step a) includes obtaining a metal-core consumable welding wire. Step b) is labeled as "Position Parts For Welding" in block 16 of FIG. 1. Step b) includes disposing the ring 26 in contact with the base cup 28 to create a joint line for welding the ring 26 and the base cup 28 together. Step c) is labeled as "GMAW Weld With Wire At Negative Potential" in block 18 of FIG. 1. Step c) includes gas metal arc welding the disposed ring 26 and base cup 28 together using the metal-core consumable welding wire at a negative electrical welding potential relative to the ring 26 and base cup 28 creating a weldment 20 (seen in FIGS. 2 and 3) along the joint line. The metal-core consumable welding wire having a negative electrical welding potential relative to the ring 26 and base cup 28 is equivalent to the ring 26 and base cup 28 having a positive electrical welding potential relative to the metal-core consumable welding wire.

In one example of the second method, the gas metal arc welding of step c) follows the joint line without weaving about the joint line. In one variation, the joint line is a substantially straight line. In this variation, the joint line is the straight line of contact between the ring 26 and base cup 28 and would otherwise be seen in FIG. 3 but is hidden by the weldment 20. In one implementation, the metal-core consumable welding wire is electrically grounded during the gas metal arc welding of step c), and the ring 26 and base cup 28 have a positive electrical welding potential during the gas metal arc welding of step c).

In the same or different example of the second method, the weldment 20 has a welding length 22 and a leg length 24 substantially transverse to the welding length 22. The pre-weld base cup 28 is thinner than the ring 26 at the weldment 20. The leg length 24 is at least equal to twice the pre-weld part thickness of the base cup 28 at the weldment 20. In one modification, the leg length 24 is at least equal to three times the pre-weld part thickness of the base cup 28 at the weldment 20. In one variation, the base cup 28 at the weldment 20 has a thickness of three millimeters or less. In another variation, the base cup 28 at the weldment 20 has a thickness of two millimeters or less.

In one execution of the second method, step c) includes adjusting the relationship between an electrical welding current and the electrical welding potential to create a sharp tip on the metal-core consumable welding wire when step c) finishes creating the weldment 20. In one construction, the damper 32 also includes a piston 34, a piston rod 36, and a cylinder end cap 38 as shown in FIG. 2. Another weldment 40 is shown in FIG. 2. In one procedure, step c) is simultaneously performed twice using two welding torches each having its own metal-core consumable welding wire to create the two weldments 20 and 40.

The second method is especially useful in attaching together a ring and a base cup wherein the ring has a length of 0.5 to 0.75 inch, an outside diameter of 1.5 to 2 inches, and a thickness of 2 to 6 millimeters, wherein the base cup has an outside diameter of 1.5 to 2 inches and a thickness of 1.5 to 4 millimeters, and wherein the ring and the base cup consist essentially of low carbon steel such as AISI 1008 to 1010 steel and which may be zinc or tin coated. A typical welding speed for such joint geometry is 40 inches per minute.

Several benefits and advantages are derived from the invention. Use of the metal-core consumable welding wire (with its powdered metal core) allows melting with lower heat input per unit weight than using solid metal cores. Having the metal core wire at a negative electrical welding potential relative to the parts causes the lighter electrons to be attracted to and strike the parts while the thousand times heavier positive ions in the arc plasma are attracted to and strike the metal core wire which results in less heat imparted to the parts than having a reversed electrical potential. The novel combination of using the metal-core consumable welding wire and the negative electrical potential of the wire relative to the parts reduces or eliminates the danger of burn through when welding parts requiring a leg length (i.e., the weldment height of the fit-up gap between two locations, one on each part, where the weldment height is substantially perpendicular to the welding length) to part thickness ratio at the weldment of at least two and allows such weld to be done with one pass along the joint line between the parts without having to weave the weld about the joint line. These large leg-length requirements are dictated by the geometry of the joint having a large gap between the parts along the weld line. A straight line weld is expected to require only half the time compared with conventional weave welds of rings to base cups of cylinders of dampers such as vehicle shock absorbers. It is noted that conventional gas metal arc welding techniques are adequate for straight line welds only when the required leg length is equal to or less than the pre-weld thickness of the thinner part.

The foregoing description of several methods of the invention has been presented for purposes of illustration. It is not intended to be exhaustive or to limit the invention to the precise procedure disclosed, and obviously many modifications and variations are possible in light of the above teaching. It is intended that the scope of the invention be defined by the claims appended hereto.

What is claimed is:

1. A method for attaching a ring to a base cup of a cylinder of a damper comprising the steps of:

a) obtaining a metal-core consumable welding wire;

b) disposing the ring in contact with the base cup to create a joint line for welding the ring and the base cup together; and c) gas metal arc welding the disposed ring and base cup together using the metal-core consumable welding wire at a negative electrical welding potential relative to the ring and base cup creating a weldment along the joint line.

2. The method of claim 1, wherein the gas metal arc welding follows the joint line without weaving about the joint line.

3. The method of claim 1, wherein the joint line is a substantially straight line.

4. The method of claim 1, wherein the metal-core consumable welding wire is electrically grounded during the gas metal arc welding, and wherein the ring and base cup have a positive electrical welding potential during the gas metal arc welding.

5. The method of claim 1, wherein the weldment has a welding length and a leg length substantially transverse to the welding length, wherein the pre-weld base cup is thinner than the ring at the weldment, and wherein the leg length is at least equal to twice the pre-weld part thickness of the base cup at the weldment.

6. The method of claim 5, wherein the leg length is at least equal to three times the pre-weld part thickness of the base cup at the weldment.

7. The method of claim 1, wherein the base cup at the weldment has a thickness of three millimeters or less.

8. The method of claim 7, wherein the base cup at the weldment has a thickness of two millimeters or less.

9. The method of claim 8, wherein the leg length is at least equal to three times the pre-weld part thickness of the base cup at the weldment.

10. The method of claim 1, wherein step c) includes adjusting the relationship between an electrical welding current and the electrical welding potential to create a sharp tip on the metal-core consumable welding wire when step c) finishes creating the weldment.

* * * * *